Feb. 16, 1960 K. W. COUSE ET AL 2,924,858
STRUCTURAL PANEL MEMBER
Filed Oct. 16, 1956 5 Sheets-Sheet 1

Inventors
Kibbey W. Couse
& Robert M. Sutphen
By Rudolph J. Jurick
Attorney

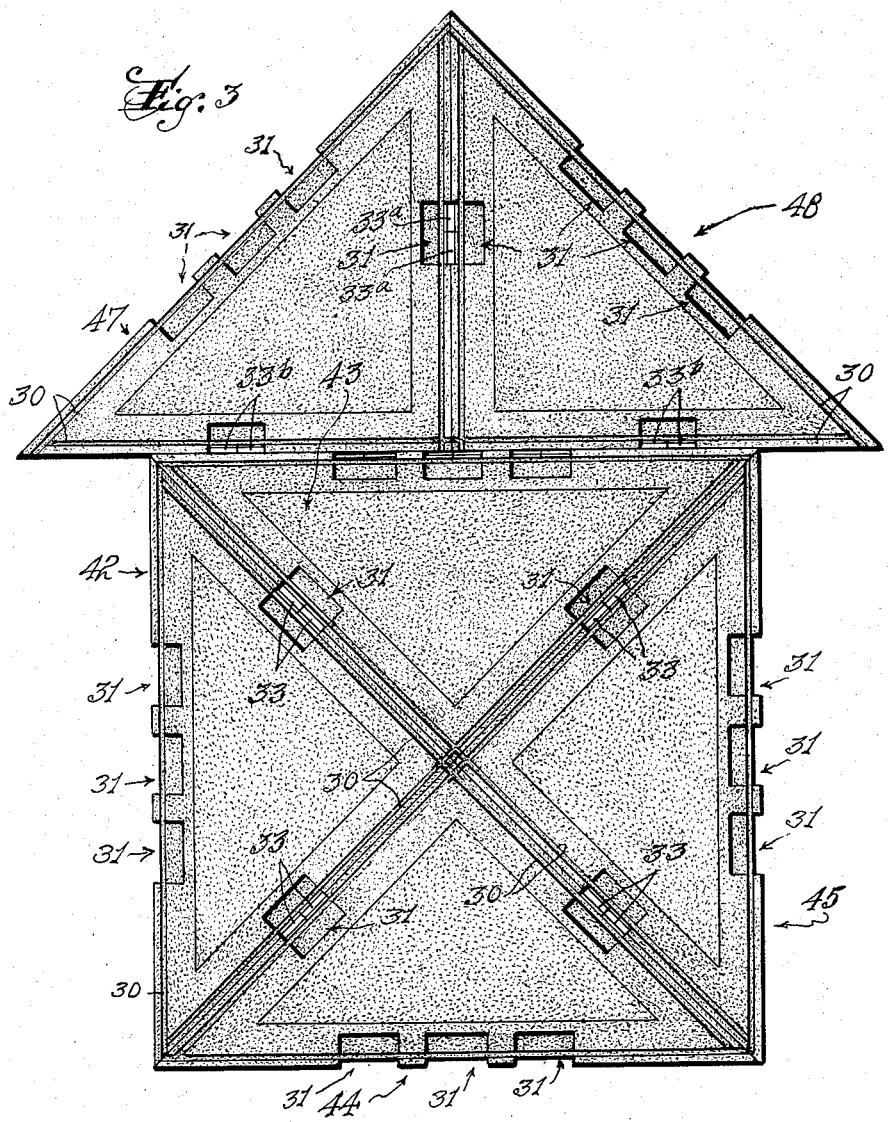

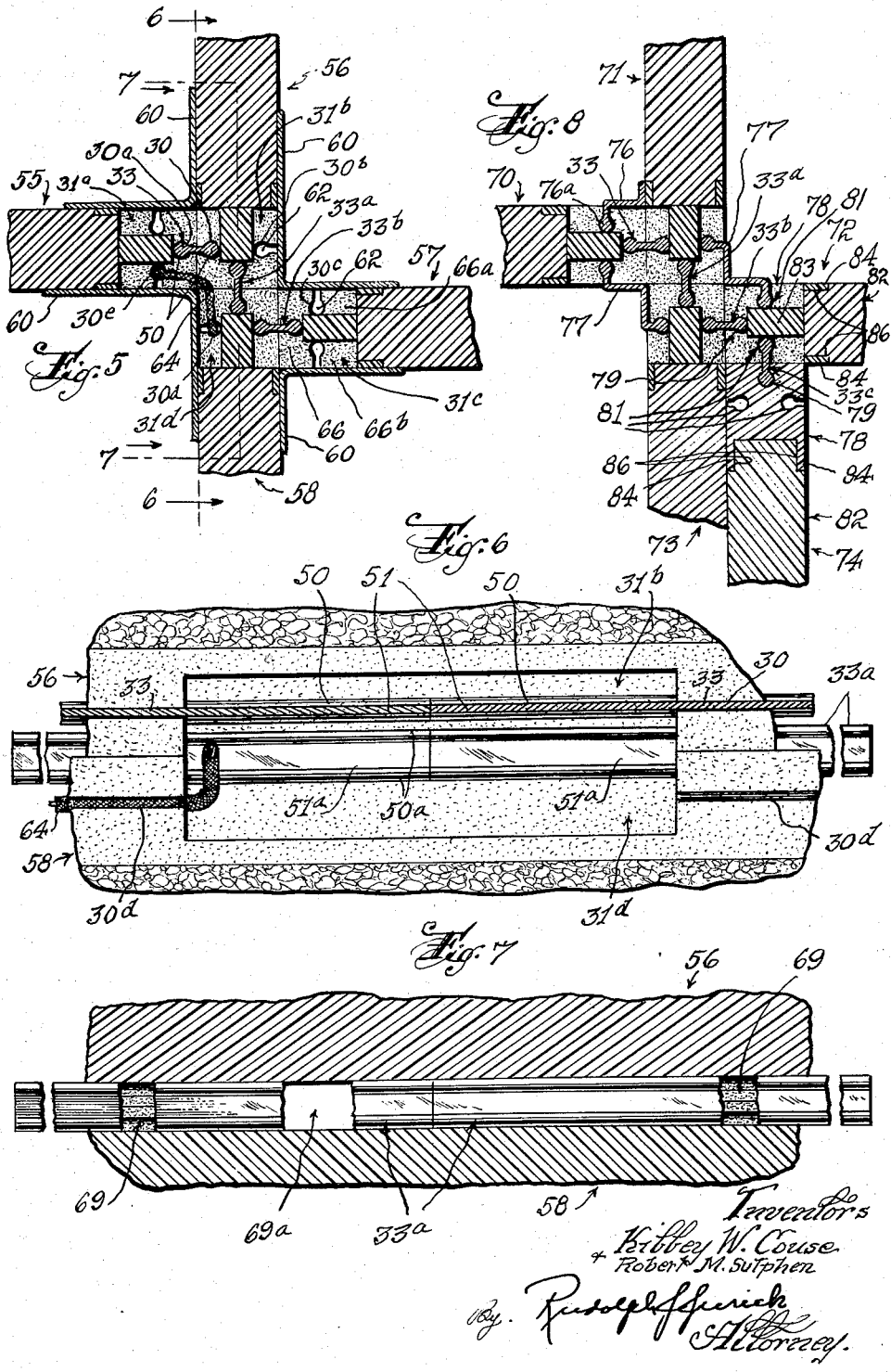

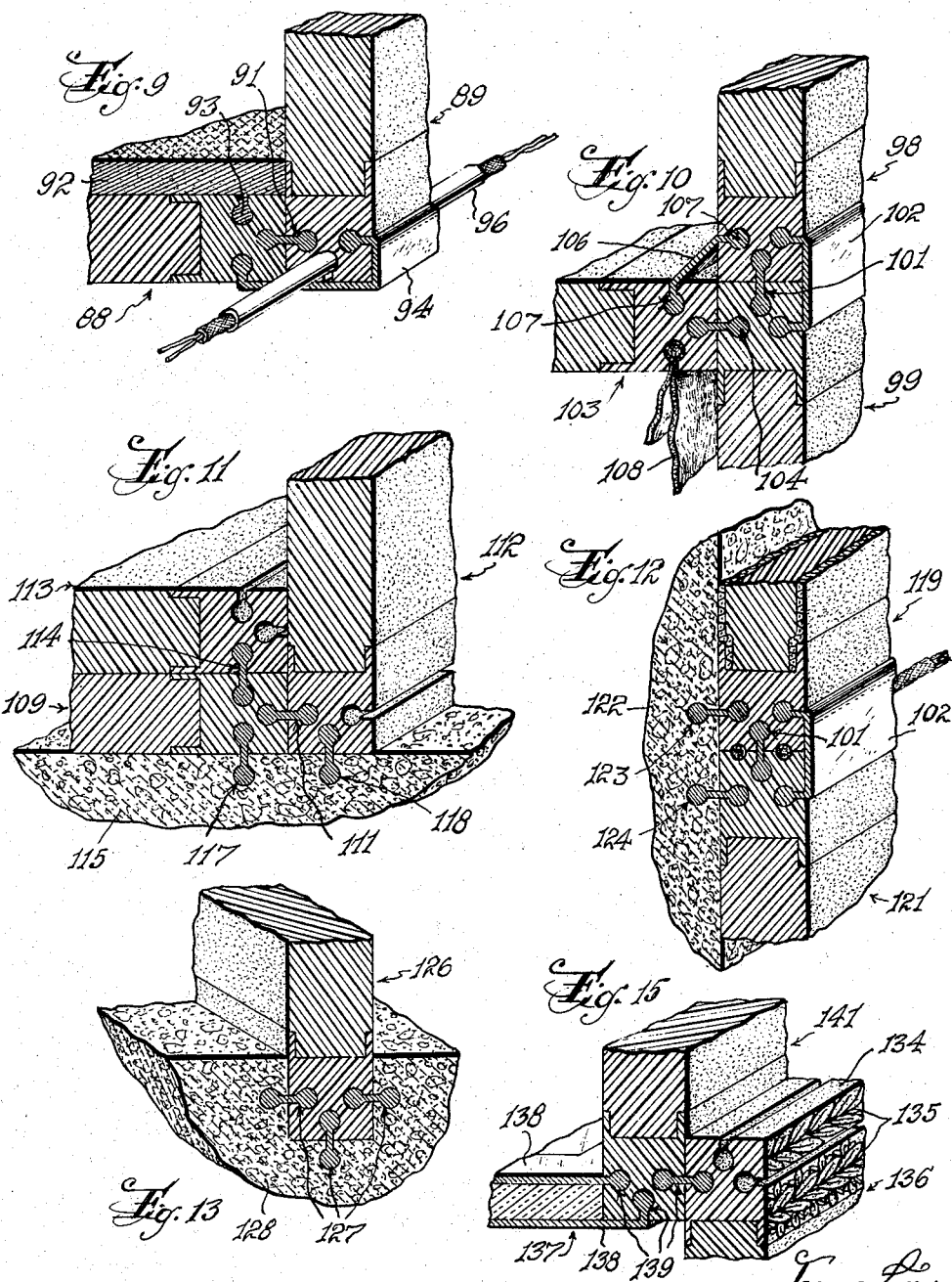

Feb. 16, 1960 K. W. COUSE ET AL 2,924,858
STRUCTURAL PANEL MEMBER
Filed Oct. 16, 1956 5 Sheets-Sheet 5
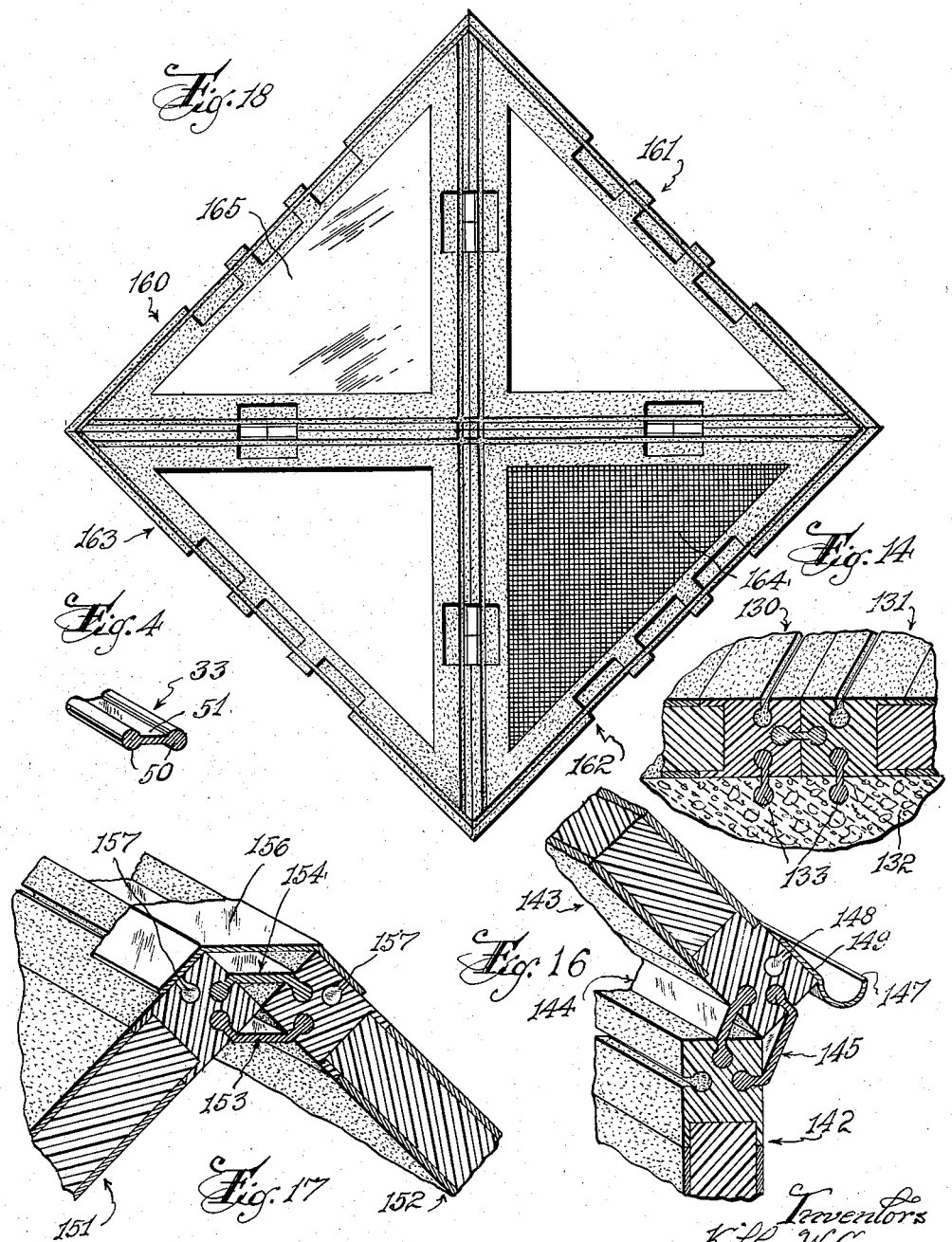

… … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … …

United States Patent Office 2,924,858
Patented Feb. 16, 1960

2,924,858

STRUCTURAL PANEL MEMBER

Kibbey W. Couse and Robert M. Sutphen, Newark, N.J., assignors to Couse Manufacturing, Inc., Newark, N.J., a corporation of New Jersey Application October 16, 1956, Serial No. 616,298

7 Claims. (Cl. 20—15)

This invention relates to a structural panel member and more particularly to a triangular-shaped panel member having elongated grooves along the perimeter thereof which are adapted to receive binder members for connecting the panel member to adjoining panel members of substantially identical construction.

The structural panel members, or building blocks, of our invention are particularly adapted for use in the construction of portable shops, huts and other buildings wherein they are used to form the component parts thereof; i.e. the floors, walls, ceilings, roofs and the like. While, in general, structural panel members may be of any desired size or shape, a right isosceles triangular-shaped panel member is preferred wherein the short, equal length, sides thereof are approximately seven (7) feet in length. A pair of such triangular-shaped panel members joined along their diagonal edges provide a composite panel member seven (7) feet square, which may constitute an entire floor or roof of a building, or a portion thereof, if desired.

Each panel member is provided with a plurality of elongated grooves, having enlarged bottom portions. Such grooves are located on each edge of the panel member, and on both faces thereof a spaced distance from, and parallel to, the edges of the panel member. In addition to the grooves, each side of the triangular-shaped structural panel member is provided with at least one notched, or recessed, portion which extends past the edge and both faces of the panel member. Each notch, or recessed, portion comprises three cut-out sections; one on the edge and one on the opposite faces of the panel member. The depth of the notches as substantially equal to the depth of the associated edge and face groove. The panel members may be joined, or fastened together securely by positioning elongated and dumb-bell cross-sectional shaped binder members in adjoining grooves on adjacent panel members; the notches in the panel members providing access ways through which the binder members may be readily inserted into the grooves from the panel faces.

An object of this invention is the provision of a novel structural panel member for use in forming building structure components.

An object of this invention is the provision of a building block, or structural panel member, which is in the shape of an isosceles right triangle and which is provided with elongated grooves along the perimeter thereof, and notched means wherein binder members may be inserted into the said grooves.

An object of this invention is the provision of a triangular-shaped panel member having elongated grooves positioned on each of the panel edges and on the panel member faces parallel to the edges thereof, notches at each of the sides of the panel members and comprising cut-out portions at the edges and adjacent cut-out portions on the opposite panel faces extending the depth of the said grooves, the said notches providing means wherein binder members may be inserted into any of the said elongated grooves.

An object of this invention is the provision of a right isosceles triangular-shaped panel member having elongated edge grooves positioned on each side edge midway between the panel faces and elongated face grooves on both of the panel faces parallel to the edges thereof a spaced distance therefrom, the said edge and face grooves being of substantially identical shape and including an enlarged bottom portion; and recessed portions in the edge of the panel member on each side thereof and in both panel faces adjacent the said edge recessed portions, the said recessed portions providing means through which binder members are adapted to be inserted into the said grooves.

These and other objects and advantages will become apparent from the following description when taken with the accompanying drawings. It will be understood the drawings are for purposes of illustration and are not to be construed as defining the scope or limits of the invention, reference being had for the latter purpose to the appended claims.

In the drawings wherein like reference characters denote like parts in the several views:

Figure 3 is a front view of a plurality of panel members joined together to form an end wall and gable of a peaked roof building structure;

Figure 4 is a perspective view of a binder member for use in connecting adjoining panel members;

Figure 5 is a fragmentary cross-sectional view of four attached panel members;

Figure 6 is a sectional view taken on line 6—6 of Figure 5;

Figure 7 is a sectional view taken on line 7—7 of Figure 5;

Figure 8 is a fragmentary cross-sectional view of five (5) attached panel members;

Figure 9 is a fragmentary perspective view of two attached panel members used as a floor and wall structure and showing an electrical cable positioned in a groove in the wall portion;

Figure 10 is a fragmentary perspective view of three (3) adjoining building blocks, two of which form wall members and a third which forms a floor member, and showing a flexible canvas sealing member attached to the bottom of the floor member;

Figure 11 is a fragmentary perspective view of three (3) panel members used to form a double thickness floor and adjoining wall, which are attached to a concrete base;

Figure 12 is a fragmentary perspective view of two wall panel members attached to a concrete wall;

Figure 13 is a fragmentary perspective view of a building block wall member partially embedded in a concrete base;

Figure 14 is a fragmentary perspective view of two floor panel members attached to a concrete base by use of attached binder members;

Figure 15 is a fragmentary perspective view of two building block wall members and an attached thin floor member;

Figure 16 is a fragmentary perspective view of two building block members joined so as to form a wall and roof portion of a building structure;

Figure 17 is a fragmentary perspective view of two building blocks, joined so as to form portions of a peaked roof structure; and, Figure 18 is a front view of four building blocks showing various materials which may be used in the construction thereof.

Figure 1:
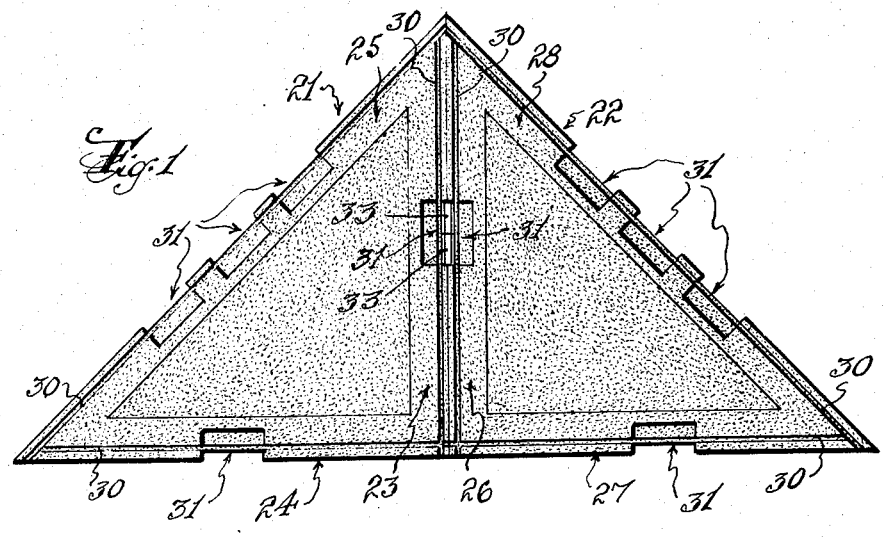
Figure 1 is a front view of two of our novel triangular-shaped panel members, or building blocks, joined at adjacent short sides thereof.

Reference is now made to Figure 1 of the drawings wherein there is shown two triangular-shaped panel members designated generally by reference numerals 21 and 22. Each of the panel members is of a right isosceles triangular-shape which includes two equal length short sides 23, 24 and 26, 27, respectively, and a long side 25 and 28, respectively. The two short sides 23 and 26 are joined in an abutting edgewise manner.

As seen in Figure 1, the panel members 21 and 22 are provided with elongated groove 30 which extend parallel with the side edges of the panel members. Identical shaped grooves (which are not visible in Figure 1) are formed on each edge and on the opposite faces of the panel members. Recessed portions 31, which extend past the grooves, are formed on each of the three sides of the triangular-shaped panel members; one recessed portion 31 being located on each of the short sides 23, 24 and 26, 27 and three recessed portions being located on each of the long sides 25 and 28 of the panel members. The recessed portions 31 on the short sides of the panel members are located at the center of the sides. The central recessed portion 31 on the long side of the panel members is also located at the center of the long sides and, as will be clearly seen in Figure 2, the two recessed portions on opposite sides of the central recess are located the distance of one-half the length of a short side of a panel member from the ends of the long sides. (All of the dimensions are made from the center of the recessed portion.) The purpose of the recessed portions, and the reason for the location of the recessed portions will become apparent below. As seen in Figure 1, the two panel members 21 and 22 are joined together by binder members 33, portions of which are visible at the recessed portions 31 in the short, adjoining sides 23 and 26 of the panel members. The binder members 33 are adapted to be inserted into the grooves in the panel members through the recessed portions. Details of the joint and recess construction are given below.

Figure 2:
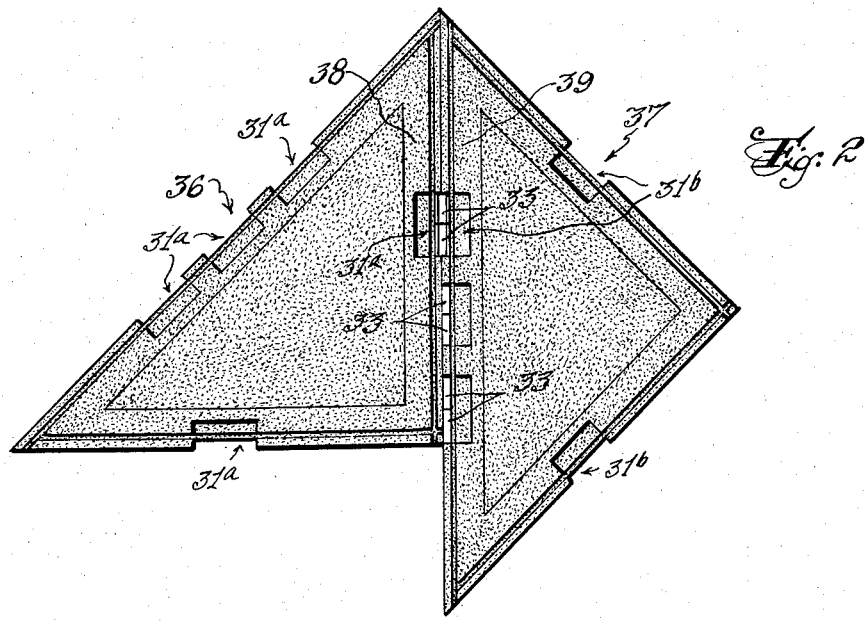
Figure 2 is a front view of two panel members joined at the short side of one and the long side of the other.

Reference is now made to Figure 2 of the drawings wherein two panel members 36 and 37 are shown joined at the short side 38 and long side 39 of the respective members. In Figure 2, it is seen that the recessed portion 31a on the short side 38 of one panel member 36 is located directly opposite the recessed portion 31b in the long side of the other panel member 37 when the upper corners of the two panel members are at the same level. When recessed portions on adjoining panel members are positioned directly opposite each other, the two panel members may be joined by binder members inserted through the recessed portions and into adjoining grooves on the panel members. In Figure 2, the panel members 36 and 37 are joined by binder members 33 which are passed through the recessed portions 31a and 31b and inserted into adjoining grooves in the panel members. It will be understood, however, that each of the edge grooves on the panel members extend the entire length thereof and, therefore, binder members may be inserted from the ends of the grooves as well as through adjoining recessed portions, if desired. In the construction of building structures, however, the ends of the grooves on adjoining panel members are not always accessible in which case binder members must be inserted into the grooves through adjoining recessed portions.

As mentioned above, the triangular-shaped panel members are preferably seven (7) feet in length on the short sides thereof. It will be apparent that several panel members may be joined together and used to form building components such as floors, walls, etc. In Figure 3, a plurality of such panel members are shown joined so as to form a building end wall and gable construction. Referring to Figure 3, four panel members 42, 43, 44 and 45 are shown joined together to form the end of the building structure; the resulting end wall being somewhat less than ten (10) feet square when the above-mentioned size panel members are used where the short sides are seven (7) feet in length. Two panel members 47 and 48 form the gable construction of the structure. The panel members 42 through 45 are joined together by binder members 33 which are passed through adjoining notches on the short sides thereof and inserted into adjacent grooves at the panel edges. The gable panel members 47 and 48 are joined by the binder members 33 and, in turn, are attached to the long side of the panel member 43 by use of binder members 33b.

A perspective view of a binder member 33 is shown in Figure 4. Referring to Figure 4, the binder member 33 is made with a substantially dumb-bell cross sectional shape comprising enlarged edge portions 50 joined by a thin web portion 51. Obviously, the enlarged edge portions may be made of other shapes than the illustrated circular shape providing the grooves in the panel members are of similar shape. The exact shape of the grooves and binder members 33 is not important, so long as the grooves are provided with enlarged bottom portions which are adapted to receive enlarged edge portions on the binder members. The binder member 3 may be made of metals, plastic, wood, hard rubber or any other suitable material, and may be stiff or relatively flexible. If the binder members are made of stiff material, the length must be made slightly less than the length of a recessed portion 31 in the panel members in order that the binder member may be placed in adjacent recessed portions in adjoining panel members and slid longitudinally into the panel member grooves. If, on the other hand, the binder members are made of sufficiently flexible material, they may be flexed enough to be inserted into the grooves through the recessed portions from outside of the recessed portions.

In Figure 5 of the drawings a fragmentary end view of a connection between four (4) building blocks 55, 56, 57 and 58 is shown. Referring to Figure 5, the building block 55, which forms a floor panel member, is shown attached by means of a binder member 33 to the building block 56, which forms a wall panel member of a building structure. One enlarged edge portion 50 of the binder member 33 engages the edge groove 30a in the floor panel member 55 while the other enlarged edge 50 engages the enlarged groove 30 in the face of the wall panel member 56. In this manner a rigid right angle connection between the panel members 55 and 56 may be made. Similarly, a binder member 33b connects a floor panel member 57 to the wall panel member 58; while a binder member 33a connects the two wall panel members 56 and 58 in an abutting edgewise relation. Each of the resulting corners between panel members is shown covered by a corner covering member 60 which may be attached to the panel members by means of short lengths of binder elements secured to the covering members which are inserted into grooves in the faces of the panel members. By way of illustration, the corner covering 60 between the wall panel member 56 and floor panel member 57 is attached by binder elements 62 (only the ends of which are seen in Figure 5) which are integrally formed on the corner cover and which are inserted into the grooves 30b and 30c in the wall and floor panel members, respectively. Also, the grooves in the panel members may be used to support electrical cables, and the like. In Figure 5, a cable 64 is shown extending between the groove 30e in the floor panel member 55 and the groove 30d in the wall panel member 58 at a recessed portion in the panel members.

It is seen that the fragmentary sectional view of Figure 5 is taken at recessed portions in the connected panel members; the recesses in the panel members 55, 56, 57 and 58 being designated generally 31a, 31b, 31c and 31d respectively. All of the recessed portions are of identical shape; each comprising three cut-out portions one cut-out portion 66 at the edge of the panel members and two cut-out portions 66a and 66b, one on each face thereof. (For clarity in the drawing, only the floor panel member 57 is provided with reference numerals designating the three-cut portions 66, 66a and 66b, the cut-out portions on the other panel members being clearly shown in the drawing.) It is seen that all of the grooves 30, 30a, 30b etc., in each of the panel members 55 through 58 are accessible through the recessed portions when the corner coverings 60 are removed. To join any two panel members with a binder member, the recessed portions in adjoining panel members are placed adjacent each other, the binder member placed in the recessed portion, aligned with the adjoining grooves, and inserted into the grooves longitudinally thereof. Obviously, if the ends of the grooves in the panel members are accessible, binder members may be inserted in the grooves from the ends of the panel members without use or benefit of the recessed portions in the panel members.

Reference is now made to Figure 6 of the drawings wherein there is shown a sectional view taken on line 6—6 of Figure 5. In Figure 6, portions of the binder members 33a which join the panel members 56 and 58, are visible in the recessed portions 31b and 31d in the panel members 56 and 58, respectively. The binder members 33a are of the usual type comprising enlarged edge portions 50a which are joined by a thin web portion 51a. The binder members 33, which join the floor panel member 55 to the wall panel member 56, are positioned above the binder members 33a. The entire cross-sectional length of the web portions 51 of the binder members 33 are visible, while only those portions of the enlarged edge portions 50 which extend into the recess 31b may be seen. The cable 64 extends from the groove 30d at the left side of the recessed portion 31d.

Reference is now made to Figure 7 of the drawings wherein a sectional view taken on the line 7—7 of Figure 5 is shown. In Figure 7 the binder members 33a which join the panel members 56 and 58 are shown broken away at several places. The edge grooves in the panel members 56 and 58, to the left and right of the recessed portion, are indicated generally by reference numeral 69. The reference numeral 69a (where one of the binder members is shown broken away) designates an area where a section of the panel members 56 and 58 have been removed to form part of the recessed portions 31b and 31d, respectively.

A floor and wall construction which is somewhat similar to that shown in Figure 5, is shown in Figure 8. The construction shown in Figure 8, however, includes a double thickness wall portion. Referring to Figure 8, panel members 70, 71, 72 and 73 are joined by the binder members 33, 33a and 33b in a manner similar to the connections between the panel members 55, 56, 57 and 58 of Figure 5. In Figure 8, however, a double thickness wall portion is formed by the inclusion of the panel member 74 which is attached to the floor panel member 72 by means of a binder member 33c, and is in a juxtaposition with the wall member 73. A floor edging member 76, which is provided with an enlarged edge portion 76a which is inserted in a groove in the floor panel member 70, covers the joint between the wall and floor panel members 71 and 70, respectively. The connections between the panel members may be strengthened by the use of W-shaped binder members 77 which are shown positioned between the floor panel member 70 and wall panel member 73, and between the wall panel member 71 and floor panel member 72. The W-shaped binder members are provided with the usual enlarged edge portions which are adapted to slidably engage the grooves in the panel members.

It may here be noted that the panel members of our invention may be made of any suitable material such as metal, plastic, wood and the like; which material has sufficient strength and rigidity for the structural use for which it is intended. One possible panel member construction is illustrated by the panel members in Figures 5 and 8, all of the panel members shown therein being of the same construction. (For clarity in the drawings, only the panel members 72 and 74 of Figure 8 will be supplied with further reference numerals employed in the following description of the panel construction. It will be noted that in the fragmentary sectional view of Figure 8 the section through the panel member 72 passes through a recessed portion while the section through the panel member 74 does not.) Each panel member comprises three frame members 78 (sections of only one of the frame members for the panel members 72 and 74 being visible in the fragmentary view of Figure 8) which are joined so as to form an isosceles right triangle framework. Each frame member 78 contains the usual edge groove 79 and face grooves 81. The triangular-shaped framework of frame members 78 may be enclosed with panel portions 82.

The frame members 78 may be manufactured by an extrusion process if suitable material, such as metal or plastic, is used. By extruding the frame members, machining of the frame members is reduced to a minimum thereby resulting in an economical framework construction. The recessed portions in the frame members are then cut to the depth of the groove depths as shown in the view of the frame member 78 which forms a part of the panel member 72. A rectangular-shaped rib 83 results at the recessed, or cut-out, portions of the frame member. The frame members 78 are also provided with flange members 84 which are adapted to closely fit in elongated notches 86 in the panel portion 82 of the panel members. The frame members 78 are not excessively weakened by the recessed portions as the rib 83 and flanges 84 provide the necessary strength thereat.

Reference will now be made to Figures 9 through 17 wherein several of the many possible constructions employing our novel panel members are shown. Referring first to Figure 9, a floor panel member 88 is shown joined to a wall panel member 89 by a binder member 91. The floor panel 88 is provided with a floor covering 92 which is securely attached thereto by means of binder elements 93 which fit in a face groove in the floor panels. Added rigidity may be secured by positioning a binder element 94 of generally U-shape construction, in grooves in the bottom face of the floor panel 88 and the right side face of the panel 89. An electrical conduit 96 extends through the edge groove of the wall panel member 89.

Referring now to Figure 10, wall panels 98 and 99 are shown joined by a binder member 101 and a U-shaped binder member 102. A floor panel member 103 is secured to the wall panel member 99 with the binder member 104, and to the panel member 98 with a binder member 106 which is provided with off-set end portions 107. (All of the binder members are provided with the usual enlarged edge portions which engage enlarged groove bottoms in the various panel members.) If desired, a flexible canvas member 108 may be attached to the bottom face groove of the floor panel member 103 and permitted to hang adjacent the wall panel member 99.

In Figure 11 of the drawings a double thickness floor unit is shown. Referring to Figure 11, a first floor panel member 109 is shown secured by use of a binder member 111 to a wall panel member 112. A double layer floor unit is obtained by securing a second floor panel member 113 to the first floor panel member 109 by a binder member 114. The floor panel member 109 and wall panel member 112 may be securely anchored to a concrete base 115 by means of binder members 117 and 118 extending from the floor and wall panel members and embedded in the concrete base. As shown in Figure 12 of the drawings, wall panel members may similarly be attached to a concrete wall. Referring to Figure 12 two joined wall panel members 119 and 121 are secured to a concrete wall 122 by use of binder members 123 and 124 embedded in the wall 122. A stronger and more permanent connection between a concrete base and our novel panel members may be made by the construction illustrated in Figure 13. Referring to Figure 13, a panel member 126 and attached binder members 127 are shown embedded in a concrete base 128 whereupon a permanent connection results. A further concrete to panel member fastening arrangement is illustrated in Figure 14 of the drawings. Referring to Figure 14, two attached floor panel members 130 and 131 are shown attached to a concrete base 132 by means of binder members 133.

Reference is now made to Figure 15 of the drawings wherein a frame member 134 of a panel member 136 is shown provided with a decorative pattern 135. It is seen from Figure 15, then, that the esthetic appeal of a building structure composed of decorated panel members is greatly increased. Also illustrated in Figure 15 is a floor panel member 137 which is of one-half the thickness of the ordinary panel member thickness. The panel member 137 is bounded by layers 138 which terminate in enlarged binder elements 139 which are adapted to be inserted into grooves in the wall panel member 141 in the usual manner.

A novel side wall to roof construction is shown in Figure 16 of the drawings. Referring to Figure 16, a panel member 142, which forms a portion of a wall, and a panel member 143, which forms a portion of a roof, are shown joined by use of two binder members 144 and 145. The binder members are bent so as to form the desired angle between the roof panel member 143 and wall panel member 142. The edges of the binder members are provided with the usual enlarged portions which are adapted to be positioned in grooves in the panel members as illustrated. An eave trough 147 may be secured to the roof panel member 143 by use of binder elements 148 suitably attached to a supporting arm 149 on the eave trough, and inserted in a groove on the roof panel member 143.

In Figure 17 of the drawings two panel members 151 and 152 are joined by binder members 153 and 154 in a manner somewhat similar to the connection of the panel members 142 and 143 of Figure 16. In Figure 17, however, the panel members 151 and 152 form roof members, and, when they are joined, a roof ridge construction results. A metal ridge flashing 156 is held in position by binder elements 157 secured thereto and inserted in the grooves on the side of the panel members 151 and 152 in the usual manner.

Reference is now made to Figure 18 of the drawings wherein four panel members (or building blocks) 160, 161, 162 and 163 are shown joined together. Each of the panel members comprises a triangular-shaped framework composed of grooved and recessed frame members. The frameworks may be left open as illustrated by the panel members 161 and 163. Alternatively, the panel members may be made of the screened type as shown by the panel member 162, which is provided with a screen element 164; or, a transparent material 165, such as glass, may be mounted in the framework as illustrated by the panel member 160. The various types of panel members, including the solid type panel members previously described, are utilized in different capacities in the construction of building structures.

Having now described our invention in detail in accordance with the patent statutes, various changes and modifications will suggest themselves to those skilled in this art, and it is intended that such changes and modifications shall fall within the spirit and scope of the invention as recited in the following claims.

We claim.

1. A triangular-shaped panel member having elongated grooves positioned on each of the panel member edges and on the panel member faces parallel to the edges thereof, the said elongated grooves having enlarged bottom portions and being adapted to receive binder members longitudinally thereof, and recessed portions at each of the three sides of the triangular-shaped panel member, each recess comprising adjacent cut-out portions at the edge and opposite panel faces, the said recessed portions providing means through which binder members may be inserted into any of the said elongated grooves.

2. The invention as recited in claim 1 wherein the said cut-out portions extend to a depth of the depth of the said elongated grooves.

3. The invention as recited in claim 1 wherein the said panel member is of an isosceles right triangular-shape and a recessed portion is located at the center of each of the sides thereof and on opposite sides of the center recessed portion on the long side of the panel member a distance of one-half the length of a short side of the panel member from each end of the long side thereof.

4. A structural member comprising a triangular-shaped framework, the said framework comprising frame members having elongated grooves positioned on each outside edge and on opposite faces parallel to the edges thereof, the said elongated grooves having enlarged bottom portions and being adapted to receive binder members longitudinally thereof, and notches at each of the three sides of the triangular-shaped framework, the said notches extending substantially the same depth as the depth of the said grooves and communicating with the grooves, the said notches providing access ways through which binder members may be inserted into the said elongated grooves.

5. A structural panel member having parallel face portions adjacent the edges thereof, each of the edges having elongated grooves therein positioned midway between the said parallel face portions, both of the parallel faces having elongated grooves parallel to the edges thereof and spaced the distance of one-half the panel thickness therefrom, each of the said elongated grooves being provided with an enlarged bottom portion and each being of substantially identical cross-sectional shape.

6. A structural panel member having elongated grooves positioned on the panel member edge and on the panel member faces parallel to the grooved edge thereof, the said elongated grooves having enlarged bottom portions and being adapted to receive binder members longitudinally thereof, and a recessed portion at the grooved side of the panel member, each recess comprising adjacent cut-out portions at the edge and opposite panel faces, the said recessed portions providing means through which binder members may be inserted into any of the said elongated grooves.

7. The invention as recited in claim 6 wherein the said cut-out portions extend to a depth of the depth of the said elongated grooves.

References Cited in the file of this patent

UNITED STATES PATENTS

| | | |
|---|---|---|
| 2,225,612 | Allen | Dec. 24, 1940 |
| 2,363,405 | Eichelberger | Nov. 21, 1944 |
| 2,440,449 | Raemer | Apr. 27, 1948 |